United States Patent [19]

Millard

[11] Patent Number: 4,567,917

[45] Date of Patent: Feb. 4, 1986

[54] HOSE WITH WIRE BRAID REINFORCEMENT

[75] Inventor: John J. Millard, Newton, Conn.

[73] Assignee: Stratoflex, Inc., Fort Worth, Tex.

[21] Appl. No.: 282,546

[22] Filed: Jul. 13, 1981

[51] Int. Cl.[4] .................. F16L 11/08; D04C 1/06; D04C 3/40

[52] U.S. Cl. .................. 138/126; 57/311; 87/6; 87/9; 138/123; 138/127

[58] Field of Search .................. 87/6–9; 57/9, 311; 138/123–127, 129, 130

[56] References Cited

U.S. PATENT DOCUMENTS

| | | | |
|---|---|---|---|
| 1,014,918 | 1/1912 | Subers | 138/12 C X |
| 1,779,309 | 10/1930 | Fessl | 57/311 |
| 2,564,602 | 8/1951 | Hurst | 138/125 |
| 2,829,671 | 4/1958 | Ernst et al. | 138/127 X |
| 2,962,050 | 11/1960 | Ramberg et al. | 138/127 X |
| 3,011,525 | 12/1961 | Randle et al. | 138/126 |
| 3,060,973 | 10/1962 | Mlinar | 138/126 |
| 3,090,190 | 5/1963 | Boussu et al. | 57/311 X |
| 3,378,999 | 4/1968 | Roberts et al. | 57/243 |
| 3,446,001 | 5/1969 | Akachi | 57/311 X |
| 3,463,197 | 8/1969 | Slade | 87/9 X |
| 3,481,368 | 12/1969 | Vansickle et al. | 138/125 |
| 3,786,623 | 1/1974 | Eliasson | 57/311 X |
| 3,823,543 | 7/1974 | Glushko et al. | 57/311 |
| 4,022,009 | 5/1977 | Van Assendelft | 57/902 X |
| 4,030,248 | 6/1977 | Van Assendelft | 57/902 X |
| 4,092,897 | 6/1978 | Lalikos et al. | 87/6 X |
| 4,195,469 | 4/1980 | Tarantola | 57/311 |
| 4,275,937 | 6/1981 | Belofsky | 138/127 |
| 4,332,278 | 6/1982 | Lalikos et al. | 138/127 |

FOREIGN PATENT DOCUMENTS 2151954 4/1973 France .
2386636 11/1978 France .

Primary Examiner—John Petrakes
Attorney, Agent, or Firm—Marshall, O'Toole, Gerstein, Murray & Bicknell

[57] ABSTRACT

This disclosure relates to a hose including a tube and a braided wire reinforcement covering the tube. The wire braid includes a plurality of interwoven strands of wires, and each strand includes a plurality of wires having a uniform tension and a twist of from approximately one turn for each two and one-half to three inches. Further, each of the wires of the strand is preformed to produce a helical tension spring configuration, and the strands are braided under a relatively high tension. The hose is made by a method including the steps of preformng wires to produce the helical tension spring configuration, combining a plurality of such wires under a uniform tension and twisting such wires to form strands, and braiding a plurality of such strands under high tension.

15 Claims, 16 Drawing Figures

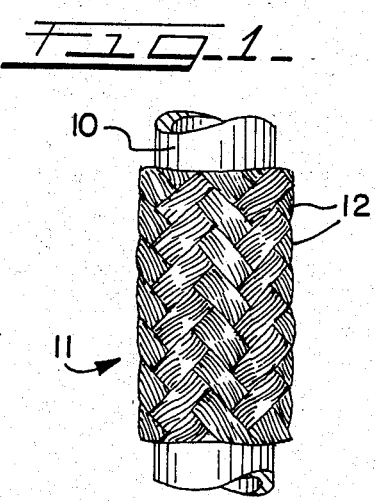
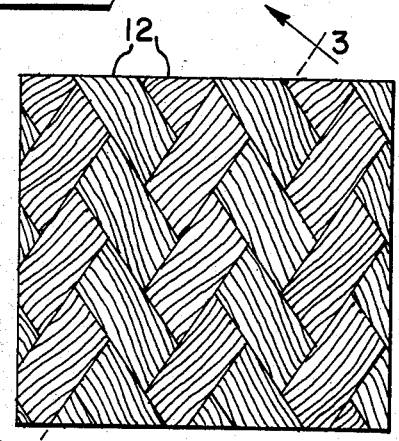
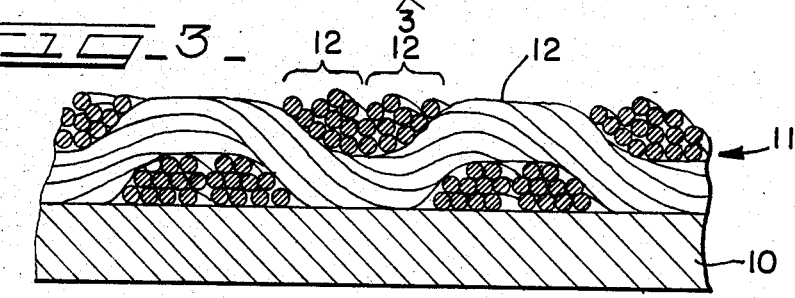
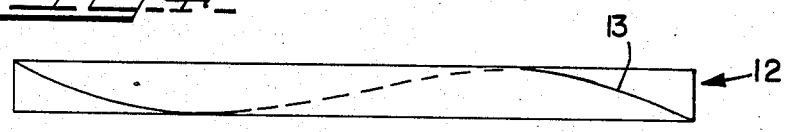
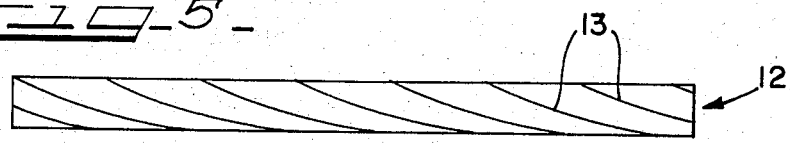

FIG-6-
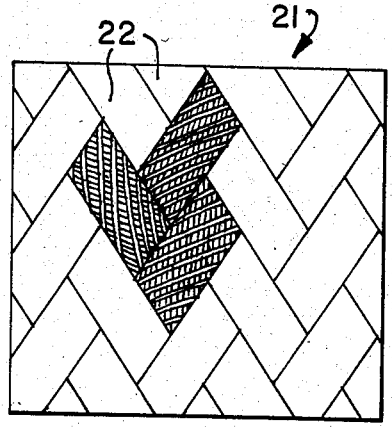
FIG-9-
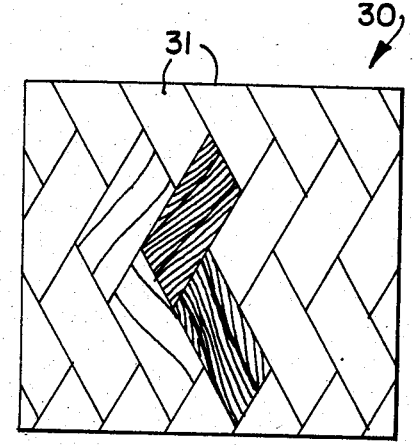
FIG-7-
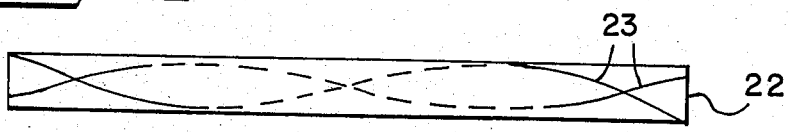
FIG-8-
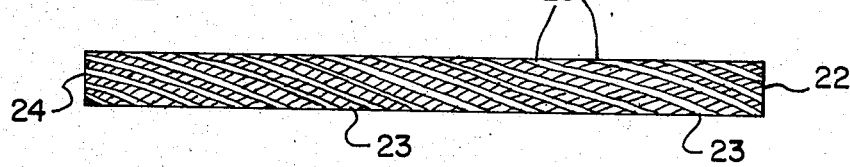

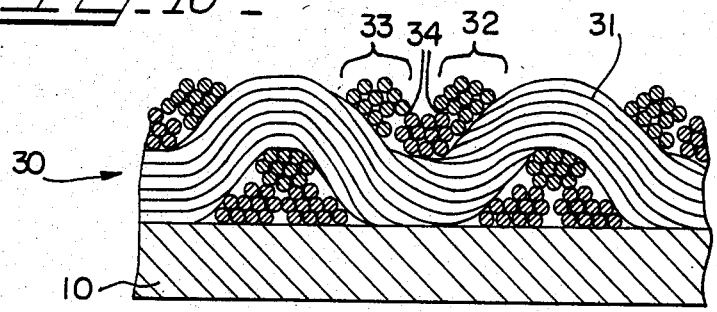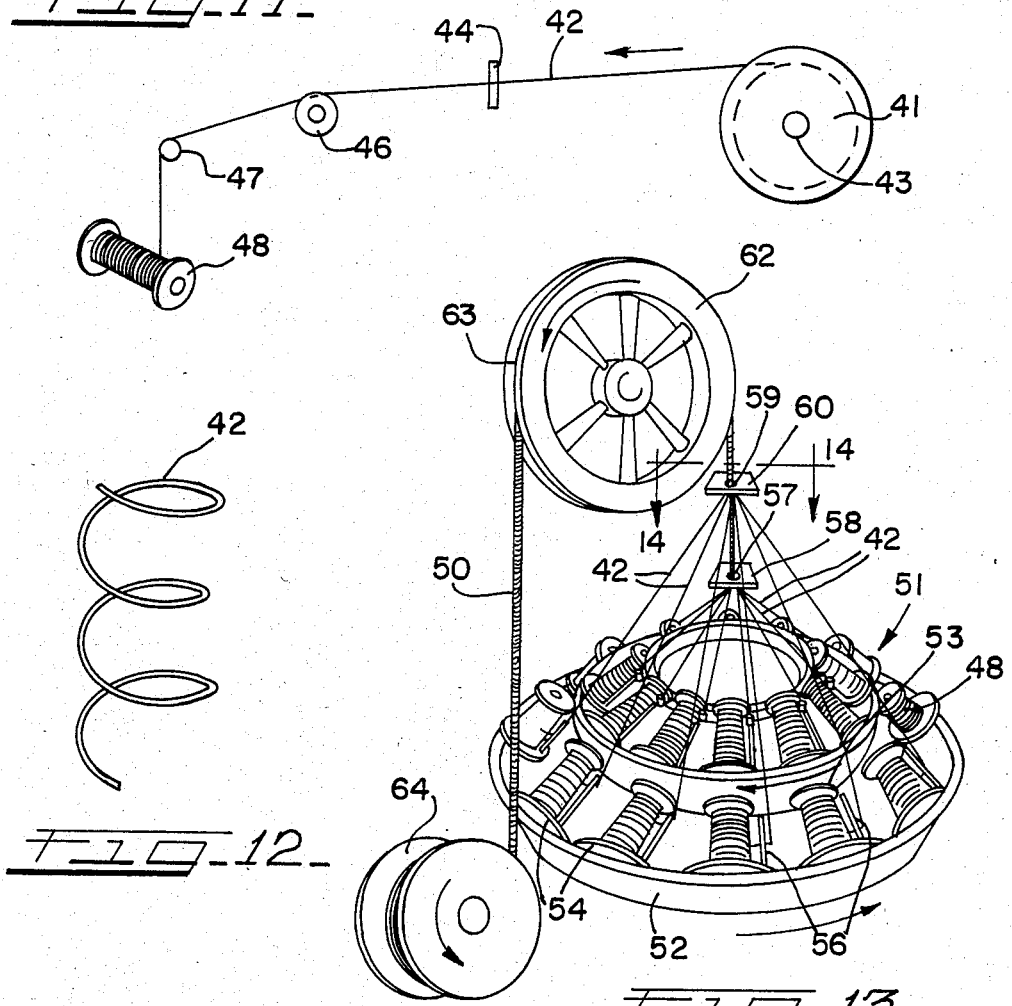

HOSE WITH WIRE BRAID REINFORCEMENT

DISCLOSURE

Composite reinforced hose, or flexible conduit, has been well-known and in use by industry and the military for many years. As described in the book titled "Hose Handbook" published by the Rubber Manufacturers Association, such hose normally includes a flexible inner tube, one or more layers of reinforcement and an outer cover. In some hose the reinforcement also forms the outer cover. The inner tube is made of a flexible material such as natural or synthetic rubber, or a plastic such as nylon or polytetrafluoroethylene (PTFE). The reinforcement may be made of a fabric for low pressure applications but wire is used for medium pressure and for high pressure applications. There are a number of types of reinforcement for the hose, but the most commonly used types are the spiral wire wrap and the wire braid. Most braided wire hose consists of a plurality of strands or bands of flat parallel wires which are woven together around the outside of the inner tube.

In conventional braided wire hose of the last-mentioned type wherein the strands consist of flat bands of parallel wires, it is a fairly simple matter to make the tension uniform among the wires, because the wires do not shift or move in the strands. Assuming that the wires forming such a braided wire reinforcement are uniformly tensioned, the burst strength of the hose depends upon the amount of wire in the reinforcement and can be calculated from the following equations:

$$\text{Theoretical Burst Pressure} = \frac{N \times L \times T \times F}{P \times D} \text{ or }$$

$$\frac{N \times L \times T \times F}{2.23 \, D^2}$$

where:
- N = Number of Wire ends per layer of reinforcement
- L = Number of Layers (plys) of braids or spirals
- T = Tensile strength of the wire in pounds (actual)
- F = Theoretical Factor (1.6) if the Pitch Angle is 54° 42'
- P = Pitch = 2.23 times the mean diameter of the reinforcement
- D = Mean diameter of the reinforcement (Not Hose I.D. nor O.D.)

If a higher strength hose is required than can be obtained from a single layer of reinforcement, there are two methods of obtaining a higher burst pressure: First, a second separate layer of wire braid, similar to the first layer, may be applied over the first layer, but this method has the disadvantage that a second braiding operation is required and a second layer of wire braid is not as efficient or effective as the first layer. Another method is to use only a single layer of wire braid but to provide a larger number of wires in each band or strand. Such an arrangement is described in the Slade U.S. Pat. No. 3,463,197 and in the Ernst U.S. Pat. No. 2,829,671, wherein a relatively large number of wires are provided in each strand. In the construction shown in the Ernst patent, the strands of multi layered wires are interwoven with cotton fibers instead of additional strands of wire, and of course such hose cannot be as strong as a hose wherein the entire reinforcement is made of wire. In both the Ernst and the Slade constructions, the wires of each strand form a multi layered mound of wires, and the wires extend generally straight along the length of the strand. In the Slade reinforcement, the wires are not uniformly tensioned and they are randomly, or nonuniformly, arranged. While hose where the wires have a low, uneven tension is relatively easy and inexpensive to manufacture, it is recognized by those skilled in this art that a hose having superior performance characteristics is produced when the wires of the braid have a high uniform tension because in this case all of the wires would bear the load substantially equally. In the type of braid shown in the abovementioned Slade patent, it is difficult and therefore expensive to obtain a high uniform tension in the wires during the braiding operation, because the wires are straight and randomly arranged. Straight wires randomly arranged in a strand tend to move around in the strand making it difficult to evenly tension them. If the wires were pulled in order to highly and uniformly tension them, some of the wires would be pulled tight before other of the wires, and the taut wires would either break or prevent the other wires from being tensioned. Even if most of the wires were tensioned, during and after the braiding operation the wires of each strand would move or shift within the strand to locations of less tension, resulting in strands of unevenly tensioned wires. The foregoing problems were apparently recognized by Slade, and the patent describes a postbraiding step of prepressurization to realign the wires to an optimum pattern in order to improve the hose performance. The patent describes a method of prepressurizing the hose after braiding to approximately 50% to 95% of the known burst pressure for this purpose.

It is a general object of the present invention to provide an improved hose and method of making the same, having a braided wire reinforcement having improved pressure and pulse characteristics but which does not require a high prepressurization step.

It is a further object to provide a hose including a tube and a braided wire reinforcement covering the tube. The wire braid includes a plurality of interwoven strands of wires, and each strand includes a plurality of wires having a uniform tension and a twist of from approximately one turn for each two and one-half to three inches. Each of the wires of the strand is preformed to produce a helical tension spring configuration, and the strands are braided under a relatively high tension.

It is a still further object to provide a method of making hose including the steps of preforming wires to produce a helical tension spring configuration, combining a plurality of such wires under a uniform tension and twisting such wires together to form strands, and braiding a plurality of such strands under high tension.

The foregoing and other objects will be better understood from the following detailed description of preferred embodiments of the present invention, taken in conjunction with the accompanying figures of the drawings wherein:

FIG. 1 is a fragmentary view of a hose in accordance with the invention;

FIG. 2 is an enlarged view of a portion of the hose shown in FIG. 1;

FIG. 3 is a still further enlarged sectional view taken on the line 3—3 of FIG. 2;

FIGS. 4 and 5 are diagrammatic views illustrating the construction of a strand of the reinforcement;

FIG. 6 is a view similar to FIG. 2 but showing an alternate form of braid;

FIGS. 7 and 8 are views similar to FIGS. 4 and 5 but illustrating the construction of the embodiment shown in FIG. 6;

FIG. 9 is a view generally similar to FIGS. 2 and 6 but showing still another embodiment of the invention;

FIG. 10 is a view similar to FIG. 3 but showing the embodiment shown in FIG. 9;

FIG. 11 is a diagrammatic view of a wire preforming and winding apparatus in accordance with the invention;

FIG. 12 is a view of a wire after having been preformed by the apparatus shown in FIG. 11;

FIG. 13 is a view of twisting apparatus for preforming and twisting a plurality of wires of the character shown in FIG. 12;

Figure 14:
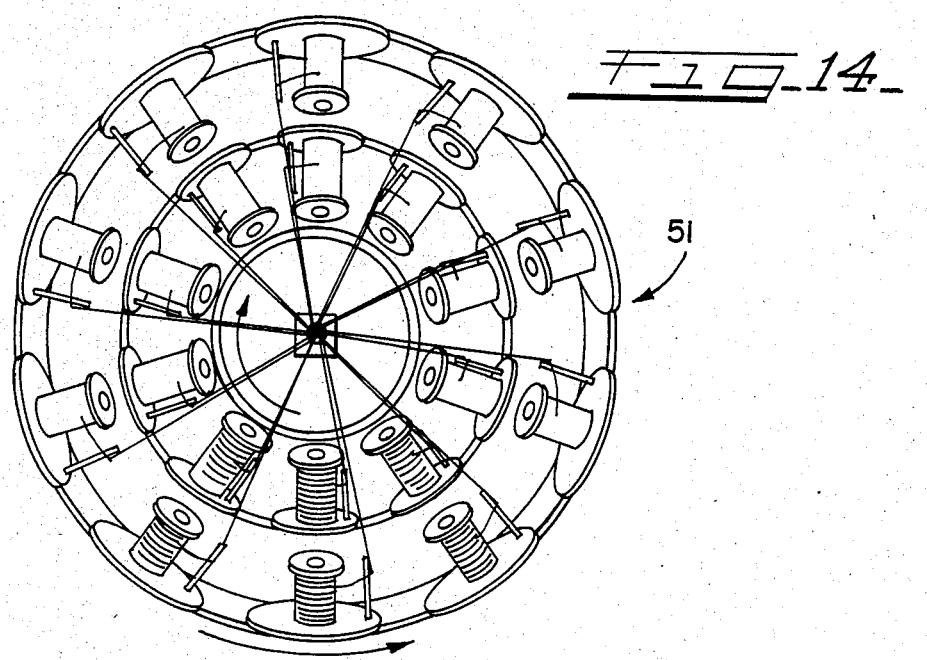
FIG. 14 is a view taken generally on the line 14—14 of FIG. 13.

With reference to FIG. 1, a reinforced hose in accordance with the invention includes a tube 10 made of a flexible material, the tube 10 being covered along substantially its entire length by a layer 11 of a braided wire reinforcement. The tube 10 contains the medium, usually a liquid under pressure, being transferred through the hose, and the layer 11 forms a reinforcement for the tube 10 and an outer protective cover. The reinforcement 11 is formed of a plurality of bands or strands, each indicated by the reference numeral 12 and composed of a plurality of wires 13 (see FIGS. 4 and 5). A plurality of such strands 12 are provided and are woven or braided in a conventional "two over and two under" fashion at a braid angle of, for example, 54° 42' measured from the axis of the tubular hose.

In the embodiment of the invention shown in FIGS. 1 to 5, each strand 12 consists of a bundle or group of ten wires 13, or "ends" as they are referred to in the trade, which may be made, for example, of 008 size high tension steel or stainless steel. The wires 13 of each strand have a twist of about one full turn for every two and one-half to three inches. The wires may turn in one direction in an "S" twist or the wires may turn in the other direction in a "Z" twist. As shown in FIG. 3, some of the strands appear in cross section to be in pairs because of the two-over and two-under method of braiding, and the wires of the strands tend to spread or flatten out slightly during the braiding operation and form rounded hills so that sharp bends in the wires are avoided.

FIG. 4 illustrates the path of a single wire 13 in a strand 12 and FIG. 5 illustrates the paths of a plurality of wires 13 in the strand. These two figures show the helical path of each wire, and it will be apparent that the wires follow regular or uniform and predictable paths relative to each other. The amount of the twist is important; if the twist is tighter or greater than the above range, such as one turn per inch, the wires are too tightly twisted and cannot spread out and the sum of the strengths of the individual wires is not obtainable. On the other hand, if the twist is less than the above range, such as one turn per three and one-half inches, the advantages, to be described, of the twist will not be attained because the wires will approach the random lay characteristics of the reinforcement described in the Slade patent.

While fewer than ten wires may be used in a smaller diameter hose, there is an upper limit to the number of wires that can be included in a strand of the character shown in FIGS. 1 to 5. On a larger size hose than that shown in FIGS. 1 to 3, a greater amount of wire will, however, be required to cover the hose. To meet this requirement, two strands or bundles 12 may be provided, each strand having, for example, ten wires and being identical with the strand 12. Each of the two strands may have a "Z" twist or both may have an "S" twist, or one may have a "Z" twist and the other may have an "S" twist. A pair of such strands would, of course, extend in parallel side-by-side relation, in the manner of a pair of adjacent strands 12 shown in FIG. 3.

The construction shown in FIGS. 6 to 8 may be used where a single bundle is desired but a relatively large number of wires are necessary. The reinforcement 21 shown in these figures includes braided strands 22 of wires 23. With reference to FIG. 8, the strand 22 includes an inner core or bundle 24 of wires which twist in one direction and is the same as the strand 12. Around the inner bundle 24 is an outer bundle 25 of wires which turn or twist in the opposite direction. When the strand 22 is viewed from the right-hand end, as seen in FIGS. 7 and 8, the wires of the inner core or bundle 24 twist toward the left and forwardly, whereas the wires of the outer bundle 25 turn toward the right and forwardly. The strands bend when braided and produce the advantages described with respect to FIGS. 1 to 5. If a lesser number of wires is necessary in each strand, the number of wires in each of the two bundles 24 and 25 may be reduced, but it is advantageous to have the same number of wires in each bundle.

If between twenty and thirty wires are required in each strand for a large size hose, the reinforcement 30 shown in FIGS. 9 and 10 may be used. This reinforcement includes braided strands 31, each strand including three bundles 32, 33 and 34, and each of the bundles 32–34 may be identical with the strands 12 shown in FIGS. 1 to 5. As shown in FIG. 10, the three bundles flatten and arrange themselves during braiding to form a smoothly curving strand of wires so that sharp bends are avoided.

FIGS. 11 to 16 show a preferred method and apparatus for making a braided wire hose of the character shown in FIGS. 6 to 8. According to the invention, the wire is preformed to a helical or corkscrew configuration as shown in FIG. 12, and this may be done in the winding machine shown in FIG. 11, in the twisting machine shown in FIG. 13 (this is preferred), or in both. The preformed wires are twisted together in the machine shown in FIGS. 13 and 14, wound on braider bobbins in the machine shown in FIG. 15, and then braided on the tube under high tension by the braider shown in FIG. 16.

The wire is received from a wire manufacturer on relatively large supply or bulk spools 41. A spool 41 is rotatably mounted on a support shaft 43, and the wire 42 is drawn off from the spool 41 and passed through a tensioning device 44. Next the wire 42 is threaded over a roller 46 and across the upper side of a hard metal rod 47, and it is then wound on a braider bobbin 48. The foregoing parts are mounted on a conventional machine frame (not shown) such that the spool 41, the roller 46 and the bobbin 48 are rotatable, and the bobbin 48 is positively driven to pull the wire 42 off of the spool 43. The tensioner 44 applies a frictional drag or pull on the wire so that the length of wire between the tensioner 44 and the bobbin 48 is taut, and the tensioner 44 is adjusted to produce a tension in the wire. The described process preforms or produces a curl in the wire 42 as shown in FIG. 12. When a length of the wire after preforming is allowed to hang free, as shown in FIG. 12, it assumes a coil or helical configuration, but when it is wound on the bobbin 48, the tension is sufficient to pull the wire nearly straight. The helical configuration imparts to the wire the qualities of a coiled tension spring. For 008 size stainless steel wire, as an example, the tension on the wire is one-half pound to one pound, and the diameter of the rod 47 is between one-fourth inch and one-half inch.

After a curl has been placed in the wire as shown in FIGS. 11 and 12, a plurality of such wires are combined to form a bundle 50. The machine shown in FIGS. 13 and 14 is a modified vertical braiding machine 51 which combines a plurality of the wires 42 and at the same time places a twist in the wires of, as previously mentioned, about one turn per two and one-half to three inches. In addition, the machine 51 produces a further preform or curl in each wire.

The machine 51 includes an annular outer ring or track 52 and an annular inner ring or track 53, and each of the tracks has fastened thereto a plurality of wire carriers 54. The wire carriers in turn receive bobbins 48 having the preformed wire 42 wound thereon. In the specific example being described, there are ten wires in each of the inner and outer bundles 24 and 25, and accordingly ten bobbins 48 are mounted on each of the tracks 52 and 53. As previously mentioned, the machine 51 may be a modified braider, and in such a machine the outer track 52 rotates in one direction and the inner track 53 rotates in the opposite direction. Normally in a braiding machine, the wire carriers 54 weave back and forth in order to interlace or braid the wires, but in the modified machine 51, the mechanism for weaving the carriers is made inoperative.

Each wire carrier includes an adjustable tensioning mechanism (not shown) for restraining the rotation of the bobbin and thereby tensioning the wire as it is pulled off the bobbin. A hard metal rod 56 is also mounted on each carrier adjacent the bobbin, and the wires 42 from the bobbins are threaded around the rods 56. The wires 42 from the inner track 53 then are passed upwardly through a hole 57 in a plate 58 that is secured to the frame of the machine above the tracks, substantially on the axis of the concentric tracks. Similarly, the wires from the bobbins on the outer track 52 extend upwardly and through a hole 59 in a second plate 60 that is mounted above the plate 58 and is also on the axis of the tracks. From the plates 58 and 60, the wires, which form a bundle 50, extend across the upper side of a rotatable wheel 62 that has a groove 63 formed in its outer periphery, and from there the bundle extends to and is wound on a relatively large spool 64.

The movement of the wires around the rods 56, under tension, produces a further curl or preform in the wires. Thus, in the specific example illustrated and described, the wires are preformed both in the winding machine (FIG. 11) and in the twisting machine (FIGS. 13 and 14). There may, however, be only one preforming operation (preferably as part of the twisting operation) but improved results are achieved with each additional preforming operation.

When forming the bundle 50, the carriers are rotated and the large spool 64 is rotated to pull the wires through the machine. The wires from the inner track join at the hole 57, and the combined rotational movement of the carriers of the inner track 53 and the longitudinal movement produced by the pull of the turning spool 64 produces a twist in the wires. The amount of the twist is determined by the rate of the longitudinal movement relative to the rate of rotation of the wire carriers, and these two rates may be adjusted to obtain the necessary twist. The wire tensioners of the wire carriers hold the wires taut and the movement around the rods 56 produces a further curl in the wires. Similarly the wires of the outer carriers will be further preformed and twisted but in the opposite direction. The bundle of wires from the inner carrier pass through the upper hole 59 and the wires of the outer carrier are wrapped around the inner wires to produce the bundles shown in FIG. 8. The desired number of wires in each bundle 24 and 25 may, of course, be obtained by varying the number of bobbins of wire mounted on the wire carriers.

The strands 12 shown in FIGS. 1 to 5 may also be produced on the machine 51, but in this event the bobbins of wire are mounted on only one of the two tracks 52 or 53 and the wires are passed through only one of the two plates 58 and 60.

Figure 15:
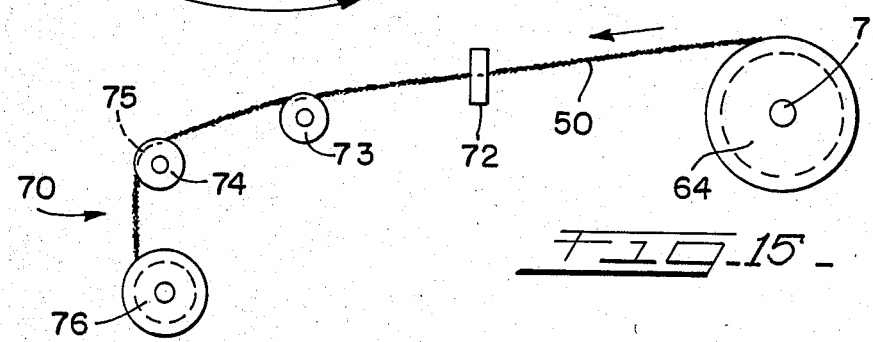
FIG. 15 shows apparatus for winding wires on a braider spool.

After winding the bundle of wires on the large spool 64, the bundle must be rewound on braider bobbins for use in a braiding machine, and a rewinding machine 70 is shown in FIG. 15. The large spool 64 is rotatably mounted on a shaft 71 and the bundle 50 is threaded through a tensioning device 72, across a first roller 73 and a grooved roller 74, and to a braider bobbin 76. The machine 70 is similar to a conventional machine for winding braider bobbins except that the rotatable grooved wheel 74 is used in place of the customary grooved beak. The tensioner 72 exerts a frictional drag on the plait and the bobbin 76 is rotatably driven, thus tensioning the section of strand between the bobbin and the tensioner 72. The width of the groove 75 in the outer periphery of the wheel 74 is substantially equal to the diameter of the bundle 50 so that the wires of the bundle are pressed together when passing over the wheel 74, thereby further shaping and forming the wires to a uniform configuration.

Figure 16:
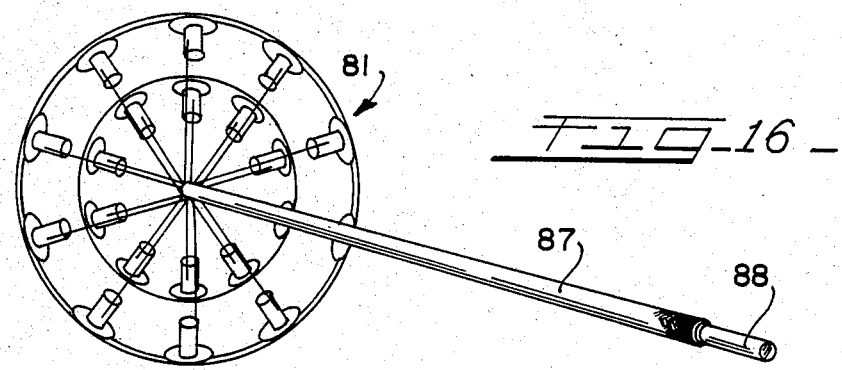
FIG. 16 illustrates apparatus for braiding the wires on a tube to form a reinforced hose.

After a plurality of bobbins 76 are wound by the machine 70, they are mounted on a conventional horizontal braiding machine 81 (FIG. 16). A length of tubing 87 is fed into the center of the machine, and as is well known to those skilled in the art, the wire carriers rotate in opposite directions and a wire braid, as shown in FIG. 6 and made up of the strands 22, is formed on the outside of the tube 87.

It is a further feature of the present invention that the wire tensioners of the braider 81 are adjusted to produce a highly tensioned wire braid. In a conventional braiding operation, the tensioners are adjusted to produce a tension of approximately 15 pounds. In accordance with this invention, the tensioners are adjusted to produce a tension in the range of from approximately 18 pounds to approximately 25 pounds, depending upon the size of the hose, and a tension of approximately 25 pounds is preferred. At such a high tension, the strands are braided very tightly on the tube 87 and compress the tube. To prevent the tube from having its inner diameter reduced or from collapsing, a mandrel 88 is inserted into the tube prior to the braiding operation. Of course, the mandrel is removed after the braid has been formed.

As is well known to those skilled in the hose art, the performance characteristics for a hose having a highly tensioned braid, and wherein the tension is uniformly distributed among the wires, are superior to the characteristics for a hose lacking such a tensioned braid. In the previously mentioned U.S. Pat. No. 3,463,197, it is described that the hose is prepressurized to approximately 50% to 95% of the known burst pressure in an attempt to realign the wires in order to achieve a higher impulse life of the hose. Hose manufactured in accordance with the present invention achieves improved impulse life without the need for such a high prepressurization step, because the wires are highly and uniformly tensioned when the hose leaves the braiding machine. Industrial and military hose, after manufacture, are proofed by subjecting it to a proof pressure of twice the rated working pressure (which is also 50% of the rated minimum burst pressure) in order to check the hose for leaks. While hose made according to this invention would normally be proofed in accordance with conventional procedures, it does not require the additional step of applying a high prepressurization pressure of close to the actual known burst pressure as described in the patent.

For hose braid having one bundle or group of wires in each strand as shown in FIGS. 1 to 5, the rewinding and braiding operations are similar to those described in connection with FIGS. 15 and 16. Where each strand includes two bundles or three bundles, each bundle similar to the strand 12, the bobbin 76 in the rewinding machine 70 receives two or three bundles, simultaneously, from spools like the spool 64. A tensioner 72 is provided for each bundle, and the bundles are joined and shaped at the groove wheel 74. The width of the groove in the wheel 74 is sized to compress and shape the wires of the bundles as previously mentioned.

Hose made in accordance with the invention has been tested and found to possess superior operating characteristics as compared with prior art hose. The following data were taken from tests of hose samples made in accordance with this invention and made in accordance with the prior art:

| Hose Sample | Braiding Tension Pounds | Twist of Wires | Actual Burst Press. P.S.I. | Impulse Cycles | Condition |
| --- | --- | --- | --- | --- | --- |
| #1 | 25 | 1 Turn Per 2½ In. | 17,400 | 270,801 | Did Not Fail |
| #2 | 25 | 1 Turn Per 2½ In. | 17,700 | 270,801 | Failed |
| #3 | 16 | 1 Turn Per 2½ In. | 15,900 | 86,579 | Failed |
| #4 | 16 | 1 Turn Per 2 In. | 15,500 | 188,338 | Failed |
| #5 | 16 | No Twist (Straight) | 16,600 | 270,801 | Did Not Fail |
| #6 | 16 | No Twist (Straight) | 16,200 | 190,638 | Failed |

Samples #1 and #2 were cut from the same length of hose, samples #3 and #4 were cut from the same length of hose, and samples #5 and #6 were cut from the same length of hose. Aside from the differences noted above in the chart, the hose samples were similarly constructed, and all of the samples were subjected to the standard proof pressure test. The impulse tests consisted of raising the pressure to 3,000 pounds with 150% peaks at a rate of 60 impulse cycles per minute. The tests were conducted in a 400° F. atmosphere. To meet the requirements of the United States military, such hose must have a minimum burst pressure of 16,000 P.S.I. and a minimum impulse cycle of 250,000 impulse cycles. Samples #1 and #2, made in accordance with this invention easily met both military requirements and had a substantial safety factor. Samples 3 and 4, which had a conventional braiding tension of 16 pounds failed to meet either of the requirements. Sample #5 met both requirements, although there was no margin of safety for the burst pressure, and the associated sample #6 failed the impulse test.

It will be apparent from the foregoing that a novel, improved and useful hose braid and method of making such a braid have been provided. The hose has superior operating and impulse characteristics as compared with conventional hose, and this advantage is obtained without the need for a high prepressurization step. By preforming the wire to produce a helical curl, and by providing a twist in a strand of wires, it is possible to place a high uniform tension in the wires during braiding. Consequently the wires equally share the pressure loads and maximum utilization is made of all of the wires. The twist in the wires is at an optimum value. A greater twist would prevent the strands from flattening during braiding, and a lesser twist would not produce the advantages of the twist. When wires are substantially straight as described in the Slade patent, the length of a strand of such wires cannot be increased without stretching and possibly breaking some of the wires of the bundle. However, when the strand of wires is twisted as described herein and the strand is pulled, it can be stretched somewhat due to the twist so that all of the strands are uniformly tensioned. Of course, the coiled tension spring configuration shown in FIG. 12 also enables the wires within each strand to be uniformly and highly tensioned.

What is claimed is:

1. A wire braid for a reinforced hose, comprising a plurality of strands of metal wire, said strands being interwoven to form a braid, each of said strands including a plurality of wires which are separately preformed by being bent transversely of the wire axis under tension prior to being combined with other wires to form said strand, and each of said wires having a coiled or helical configuration when it is untensioned.

2. A wire braid according to claim 1, wherein the wires of each of said strands are twisted.

3. A wire braid according to claim 2, wherein said twist is between approximately one turn per two and one-half to three inches.

4. A wire braid according to claim 1, wherein the wires of said strands have a uniform and regular orientation within each strand, and said wires are substantially uniformly tensioned.

5. A wire braid for a reinforced hose, comprising a plurality of strands of preformed metal wire interwoven to form a hose braid, the wires of each of said strands being substantially uniformly and regularly arranged and having a twist of approximately one turn over a length of at least two and one-half inches, and said strands having a relatively high braiding tension of at least approximately eighteen pounds.

6. A wire braid according to claim 5, wherein each of said strands includes a plurality of bundles of wires, said bundles being substantially parallel.

7. A wire braid according to claim 6, wherein one of said bundles is twisted around another of said bundles, the wires of said one bundle turning in the opposite direction to the wires of the other of said bundles.

8. A wire braid for a reinforced hose comprising a plurality of strands of metal wire, each of said wires being preformed to a coiled spring configuration when not under tension, the wires of said strands having a uniform braiding tension of between approximately eighteen pounds and twenty-five pounds.

9. A hose braid comprising a plurality of strands of metal wires, each of said strands comprising a plurality of steel wires joined together in a twisted configuration and having substantially equal longitudinal tension, said plurality of strands being interwoven on a braiding machine to form a hose braid, each of said wires further having a preform to the shape of a coiled spring-like helical coil therein when separate from said strand and in an untensioned condition, said strands receiving said preform while moving in said braiding machine.

10. A hose braid as in claim 9, wherein said steel is taken from the group consisting of stainless steel and high tension steel.

11. A hose braid as in claim 9, wherein said wires have a twist of approximately one turn over a length of at least two and one-half inches of longitudinal length of said strand.

12. A hose braid as in claim 9, wherein said braid has a braiding tension between approximately eighteen and twenty-five pounds.

13. A reinforced hose comprising a tube, at least one layer of metal wire reinforcement on said tube, said wire reinforcement being formed by a plurality of strands of wire woven in a braid and having a braiding tension of between approximately eighteen pounds and twenty-five pounds, each of said strands including a plurality of tensioned wires and having a twist of between approximately one turn per two and one-half to three inches, and each of said wires having a coiled spring-like configuration when it is untensioned.

14. A hose braid as in claim 9, wherein said wires are preformed by being bent transversely of the wire axis under tension to produce said helical coil.

15. A reinforced hose as in claim 13, wherein each of said wires is preformed by being bent transversely of the wire axis under tension to produce said coiled spring-like configuration.

* * * * *